(12) United States Patent
Janczak

(10) Patent No.: US 6,182,367 B1
(45) Date of Patent: Feb. 6, 2001

(54) POWER-DRIVEN WORK TOOL

(75) Inventor: Jerzy Janczak, Hägersten (SE)

(73) Assignee: Aktiebolaget Electrolux, Stockholm (SE)

(*) Notice: Under 35 U.S.C. 154(b), the term of this patent shall be extended for 0 days.

(21) Appl. No.: 09/309,439

(22) Filed: May 11, 1999

(30) Foreign Application Priority Data

May 14, 1998 (SE) ........................................ 9801708

(51) Int. Cl.$^7$ ............................ B23D 49/11; B23D 49/16
(52) U.S. Cl. ............................ 30/392; 30/199; 30/277.4; 30/296.1
(58) Field of Search ................................... 30/296.1, 199, 30/177, 132, 392, 393, 277.4, 394

(56) References Cited

U.S. PATENT DOCUMENTS 4,651,420 * 3/1987 Lonnecker ........................ 30/296.1

* cited by examiner

Primary Examiner—Douglas D. Watts
(74) Attorney, Agent, or Firm—Pearne & Gordon LLP

(57) ABSTRACT

Power-driven work tool including a shank (2, 3), a drive motor (4), and a working tool (1) driven by the motor. The working tool is rotatable around at least one axis perpendicular to the shank by a controller (8). The controller is attached to the shank and connected to the working tool or a bracket thereof by a wire or rod (10), which transmits pulling or pushing force. The motor (4) is at one end of the shank (2, 3) and adapted to drive the working tool (1) provided at the other end of the shank via a drive shaft extending through the shank. The shank is provided at the end thereof connected to the working tool with a hinge (6) for angular movement of the working means, and the drive shaft provided in the shank (2, 3) is connected to the working tool via a flexible shaft extending through the hinge (6).

8 Claims, 3 Drawing Sheets

POWER-DRIVEN WORK TOOL

BACKGROUND OF THE INVENTION

Field of the Invention

The present invention relates to a power-driven work tool comprising a shank, an engine provided at one end of the shank, and a working means connected by a hinge to the shank at a second end thereof and rotatable around at least one axis perpendicular to the shank, the engine driving the working means via a drive shaft extending through the shank.

A plurality of shank-mounted work tools of different types are used at present, such as clearing saws, grass and hedge trimmers, pruning saws, and the like. In such work tools, a working means is usually fixed to the shank which means that the operator must turn the whole shank and/or change his own position in order to be able to perform an intended working phase. Some working phases may yet be difficult to perform.

It has therefore been previously proposed to attach the working means to the end of the shank such that the working means is adjustable to different angular positions relative to the shank; see for instance WO91/15944, U.S. Pat. No. 4,760,646 and U.S. Pat. No. 4,916,818. With this type of device, however, the operation must be interrupted to alter the angular orientation of the working means, and the working means must be secured at the new angular orientation by securing means provided on the working means. In the case of a pruning saw having a long shank, for example, it is a time consuming operation between cutting of two branches to bring the work means down to ground level, adjust the angular orientation of the work means relative to the shank, and then subsequently raise the work tool for cutting the next branch.

In previously known devices having an adjustable working means, various types of gearing have been used for transmitting driving torque across a hinge. This results in an increased weight and size of the work tool, which will therefore be more cumbersome and heavy in use.

In addition to this type of work tool, there are also work tools utilizing a tool shank having a complete work tool, i.e. comprising an engine as well as a working means hinged to one end of the tool shank. Unfortunately, this arrangement results in a heavy weight load at the outer end of the shank, and therefore makes operating the work tool very tiring. Examples of such devices are provided by U.S. Pat. No. 4,207,675 and GB-B 2266682.

In the device according to GB-B 2266682, the other end of the shank is provided with an extra counterweight in order to balance the weight of the tool. This means that the total weight of the work tool is at least tripled, considering the length of the levers on which the tool and the counterweight, respectively, are acting. Further, in this known work tool the tool is suspended in a pivotable cradle attached to the forward end of the shank which makes the work tool very cumbersome and difficult to use in narrow spaces.

The known work tools have either a shank of fixed length, which means that the working range is predetermined, or a telescoping shank. The telescoping parts of the shank are latched in a predetermined mutual position for each work phase, which means that the work must be interrupted for altering the length of the shank.

SUMMARY OF THE INVENTION

The present invention is directed toward a work tool that is adaptable, simple, and easy to handle. The present invention is also directed toward a work tool having a working means attached to a shank and easily adjustable during operation, the working means having a low weight and being driven without a heavy and bulky bevel gear. The present invention is further directed toward a work tool adapted to alter the working range of a shank-mounted working means without interrupting the operation and without requiring the working means to be lowered to ground level.

The work tool according to the present invention is lightweight and adaptable in that the shank is hinged and the drive torque is transmitted via a flexible shaft extending through the hinge.

In accordance with the present invention, a work tool includes a control means provided on the shank and connected to the working means for rotating the working means around the axis by manipulating the control means.

In further accordance with the present invention, the control means preferably comprises a handle that is used for handling or user support of the work tool. The handle may be rotated in the longitudinal direction of the shank and/or around an axis perpendicular to the shank for obtaining a desired rotational movement of the working means.

The work tool of the present invention includes a shank having telescopically interconnected front and rear portions, working means, and control means. The working means and control means, which is made as a handle for one hand of the operator, are supported on the front shank portion. The rear shank portion is adapted to be held by the other hand of the operator. This arrangement enables the operator to adjust the length of the shank during operation to obtain the best accessibility and to maintain a preferred posture.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
FIG. 1 illustrates a work tool according to the present invention in operation.

FIG. 1 illustrates a work tool according to the present invention adapted for use in pruning and delimbing. The work tool comprises a working means consisting of a reciprocating compass-saw blade 1 attached to a shank comprising two telescopically interconnected tubes 2, 3, which are hereinafter referred to as the front or outer shank portion 2 and the rear or inner shank portion 3, respectively. An internal combustion engine 4 is provided for rotating a drive shaft 11, 12 that is journalled in the front and rear shank portions 2, 3. Rotation of the shaft is transformed into a reciprocating movement in a gear box 5 in a manner which is known, per se. The saw blade 1 and the gear box 5 form a portion that pivotally attached to the front shank portion 2 by a hinge 6 (see also FIG. 7). The work tool is supported on a harness 7 carried by the operator so as to be movable and balanced around a point of attachment to a supporting strap.

A handle 8, which is preferably vibrationally isolated or damped, is provided at an end of the front shank portion 2, and a gas control or the like is shown at 9. The handle 8 also constitutes a control means and is connected by two wires or rods 10 to a bracket of the saw blade 1 for transmitting pulling or pushing force for angular adjustment of the saw blade, as will be described in more detail below. As used hereinafter, connection of the wires or rods 10 to the saw blade 1 is intended to include connection of the wires or rods to the bracket associated with the saw blade 1. Moreover, the term "wire or rod" is intended to define any elongated structure that is capable of communicating or transferring pushing and/or pulling forces, such as, but not limited to, bare flexible wire, line, or cable, sheathed cables having a stationary outer sheath and a movable inner member (such as bowden cables commonly used as throttle control cables in outdoor power equipment), and rigid rods.

The rear shank portion 3 is telescopically slidable in the front shank portion 2, which means that the operator can extend or shorten the overall shank length by sliding the front and rear shank portions 2, 3 relative to each other, as shown by double arrow A. The overall length of the shank 2, 3 can be adjusted as preferred during operation by controlling one shank portion with each hand, thereby facilitating the operation, increasing the operating range, and enabling the operator to maintain a comfortable posture.

Figure 2:
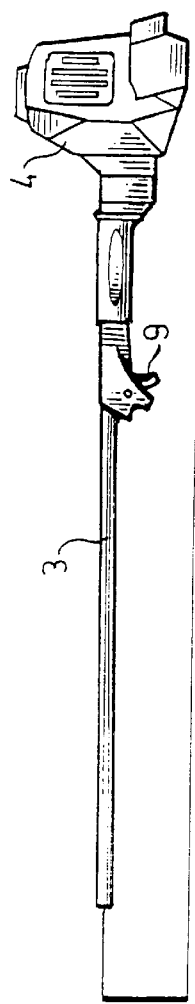
FIG. 2 shows the two main portions of the work tool.

FIG. 2 illustrates the two main portions of the work tool, namely, the front shank portion 2 having the saw blade 1 and the control handle 8, and the rear shank portion 3 with the engine 4. The front shank portion 2 is dimensioned or sized such that the rear shank portion 3 can be slidably inserted therein, as described hereinbefore. A front drive shaft 11 is provided in the front shank portion 2. The front drive shaft 11 has, for example, a square or hexagonal cross-section, and can be moved telescopically into a rear drive shaft 12 provided in the rear shank portion 3 and having a complementary cross-section.

Figure 3:
FIG. 3 shows a drive shaft forming part of the work tool.

FIG. 3 shows that the front and rear drive shafts 11, 12, which are, respectively, provided in the front and rear shank portions 2, 3, have a torque transmitting interconnecting sleeve 13 disposed relatively between the front and rear drive shafts 11, 12. Preferably, the torque transmitting member 13 is affixed to the rear drive shaft 12 and slidably receives the front drive shaft 11.

The front drive shaft 11 is transformed at its bottom end (the end opposite the rear drive shaft 12) into a flexible shaft 14. The flexible shaft 14 connects the rigid front drive shaft 11 in the front shank portion 2 to the gearbox 5 on the other side of the hinge 6 of the front shank portion 2.

Figure 4:
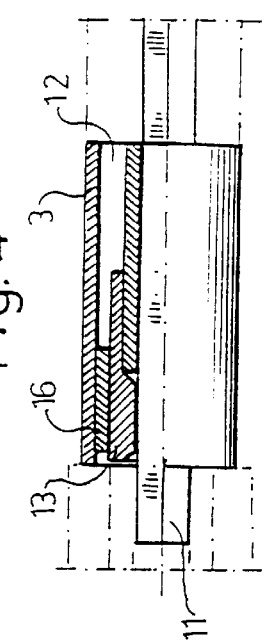
FIG. 4 shows the interconnection of the two telescoping portions of the drive shaft illustrated in FIG. 3.

Interconnection of the front and rear drive shafts 11, 12 is shown in more detail in FIG. 4. The rear drive shaft 12 is provided at its front end with the torque transmitting hexagonal sleeve 13 and a bushing 16 provided between the sleeve and the lower shank portion 3.

The front drive shaft 11 has a cross-section adapted to fit into the sleeve 13 in order to provide torque transmission between the front and rear drive shafts 11, 12 and allowing them to slide telescopically relative to each other. Accordingly, slidable insertion of the front drive shaft 11 into the torque transmitting sleeve 13 and the rear drive shaft 12 permits the front drive shaft 11 to be moved longitudinally with the front shank portion 2 relative to the rear shank portion 3 and the rear drive shaft 12 while maintaining the front and rear drive shafts 11, 12 in driving engagement via the interconnecting sleeve 13.

Figure 5:
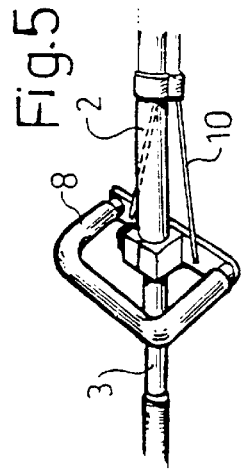
FIG. 5 shows a combined handle and control means of the work tool.
Figure 6:
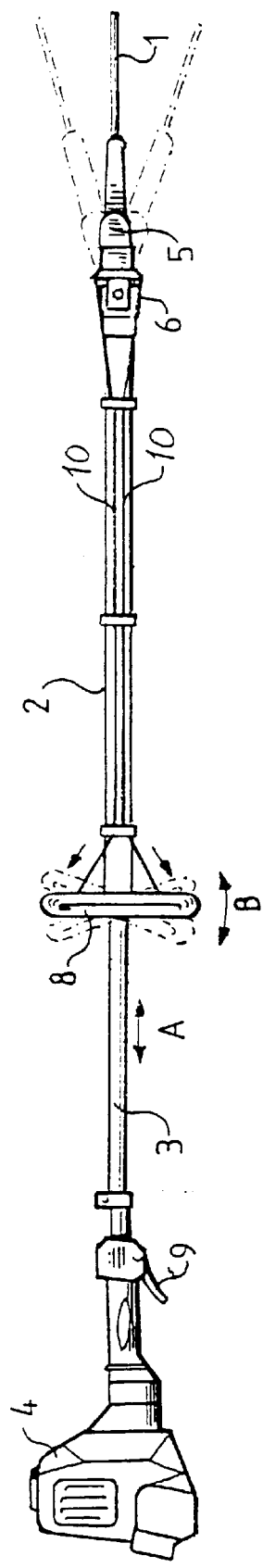
FIG. 6 illustrates angular rotation of the work tool according to one aspect of the present invention.

The combined handle and control means 8 can be made as shown in FIG. 5 and rotatable about an axis perpendicular to the shank portion 2, as shown by the double arrow B in FIG. 6. This results in pulling of one or the other of the shown wires 10 which are attached to the bracket of the saw blade 1 so as to turn the saw blade in a corresponding direction, as shown by dash-dotted lines in FIG. 6.

By manipulation of the handle 8, the operator may change the overall length of the shank 2, 3 during operation by sliding the front and rear shank portions 2, 3 relative to each other in the directions shown by arrow A. The operator may also turn the saw blade in either direction by rotating the control handle 8.

Figure 7:
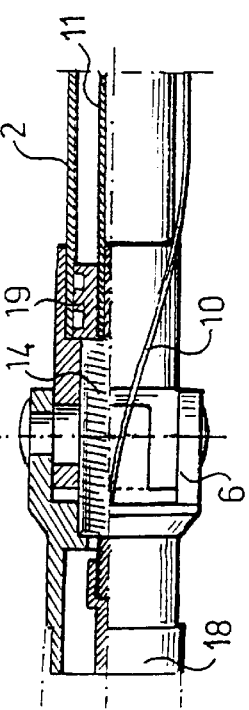
FIG. 7 is a partial view of the work tool shown in FIG. 6.

FIG. 7 shows the power transmission in the hinge 6. The front drive shaft 11 of the front shank portion 2 is provided at its end with the flexible shaft 14 of a type which is known, per se. The flexible shaft 14 is connected to an input shaft 18 of the gearbox. A bushing 19 is provided between the front drive shaft 11 and the front shank portion 2. In the embodiment shown in FIG. 7, the hinge 6 is adapted to allow rotation around the pivot axis 20. Rotation is controlled from the control handle 8 via wires 10.

The illustrated and preferred hinge 6 of the front shank portion 2 requires little extra space and does not prevent normal use of the work tool. Since the driving torque is transmitted by a flexible shaft 14 extending through the hinge 6 in a protected manner, the use of heavy and bulky bevel gears or the like is avoided.

Figure 8:
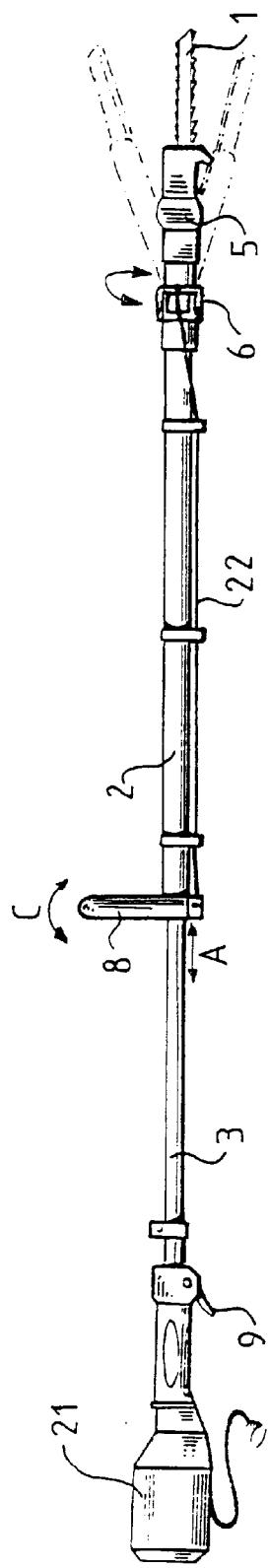
FIG. 8 illustrates angular rotation of the work tool according to a second aspect of the present invention.

FIG. 8 shows a further embodiment in which the saw blade 1 is powered by an electric motor 21. The motor can be driven by batteries, solar cells, or the like provided at the rear on the harness of the operator. In the embodiment according to FIG. 8, the control handle 8 is rotatable in the manner shown in FIG. 6 and, in addition, tiltable in the directions shown by double arrow C. By using wires or rods 22 transmitting pushing force the angle of the saw blade 1 can be changed in a further direction, as shown in FIG. 8. Such a device, which allows adjustment of the range of operation by sliding the front and rear shank portions 2, 3 telescopically and adjustment of the angle of the working means in two mutually perpendicular directions, provides an essentially increased efficiency in certain phases of operation and makes it possible to perform phases of operation which have previously been difficult to carry out by shank-mounted working means.

Although the invention has been described above in connection with a compass-saw, a device according to the invention may be used with any optional working means such as circular saw, chain saw, pruning shears, grinding and cutting discs, and the like. The described device utilizes two wires but it is also possible to use only one wire or rod for transmitting pulling or pushing force. If preferred, three or four wires may also be used.

If an operation requires a very long shank, further tubular shank portions can be interconnected between the shank portions supporting the engine and the working means, respectively. Such lengthening pieces may be provided with an inner shaft having suitable connection means. However, the principal control method described above may also be used in work tools without a shank, or having a very short shank.

What is claimed is:

1. Power-driven work tool comprising a shank (2, 3), an engine (4; 21) disposed at one end of said shank, and a working means (1) connected by a hinge (6) to said shank at an opposite end of said shank, said working means being rotatable around two mutually perpendicular axes, said axes being perpendicular to said shank, said engine driving said working means via a drive shaft (11, 12) that extends through said shank, wherein a control means (8) is provided on said shank and is connected to said working means such that said working means is rotated around said axis by manipulation of said control means.

2. Power-driven work tool comprising a shank, an engine disposed at one end of said shank, and a working means connected by a hinge to said shank at an opposite end of said shank, said working means being rotatable around at least one axis perpendicular to said shank, said engine driving said working means via a drive shaft that extends through said shank, wherein a control means is provided on said shank and is connected to said working means such that said working means is rotated around said axis by manipulation of said control means, wherein the control means (8) comprises a handle used for handling the work tool, said handle being mounted for at least one of tilting movement (arrow C) in the longitudinal direction of the shank (2, 3) and rotational movement (arrow B) around an axis perpendicular to said shank to thereby obtain a desired angular movement of the working means.

3. Work tool according to claim 1, wherein the control means (8) is connected to the working means (1) by at least two wires (10; 22) or rods.

4. Work tool according to claim 3, wherein the wires (10; 22) or rods are adapted to transmit pulling as well as pushing forces and wherein each of the wires or rods is adapted to provide an angular movement of the working means (1) in two mutually perpendicular directions in response to a corresponding combined movement of the control means (8).

5. Power-driven work tool comprising a shank, an engine disposed at one end of said shank, and a working means connected by a hinge to said shank at an opposite end of said shank, said working means being rotatable around at least one axis perpendicular to said shank, said engine driving said working means via a drive shaft that extends through said shank, wherein a control means is provided on said shank and is connected to said working means such that said working means is rotated around said axis by manipulation of said control means, wherein the shank comprises telescopically interconnected front and rear shank portions (2, 3), the working means (1) and the control means (8), which includes a handle to be held by one hand of the operator, are supported on the front shank portion (2), and the rear shank portion (3) is adapted to be held by the other hand of the operator.

6. Work tool according to claim 1, wherein a portion of the drive shaft disposed in the shank (2, 3) is divided into two telescopically interconnected portions that are mutually engaged for transmitting a driving torque.

7. Work tool according to claim 5, wherein the drive shaft comprises a front drive shaft and a rear drive shaft, the front drive shaft being disposed in the front shank portion and the rear drive shaft being disposed in the rear shank portion.

8. Work tool according to claim 7, wherein the rear drive shaft includes an interconnecting member that slidably and telescopically receives an end of said front drive shaft.

* * * * *